3,563,770
PRESERVATION OF FISH
Thomas E. Furia, Hartsdale, N.Y., assignor to Geigy Chemical Corporation, Ardsley, N.Y., a corporation of New York
Filed Dec. 28, 1967, Ser. No. 694,161
Int. Cl. A23b 25/00
U.S. Cl. 99—158                                            3 Claims

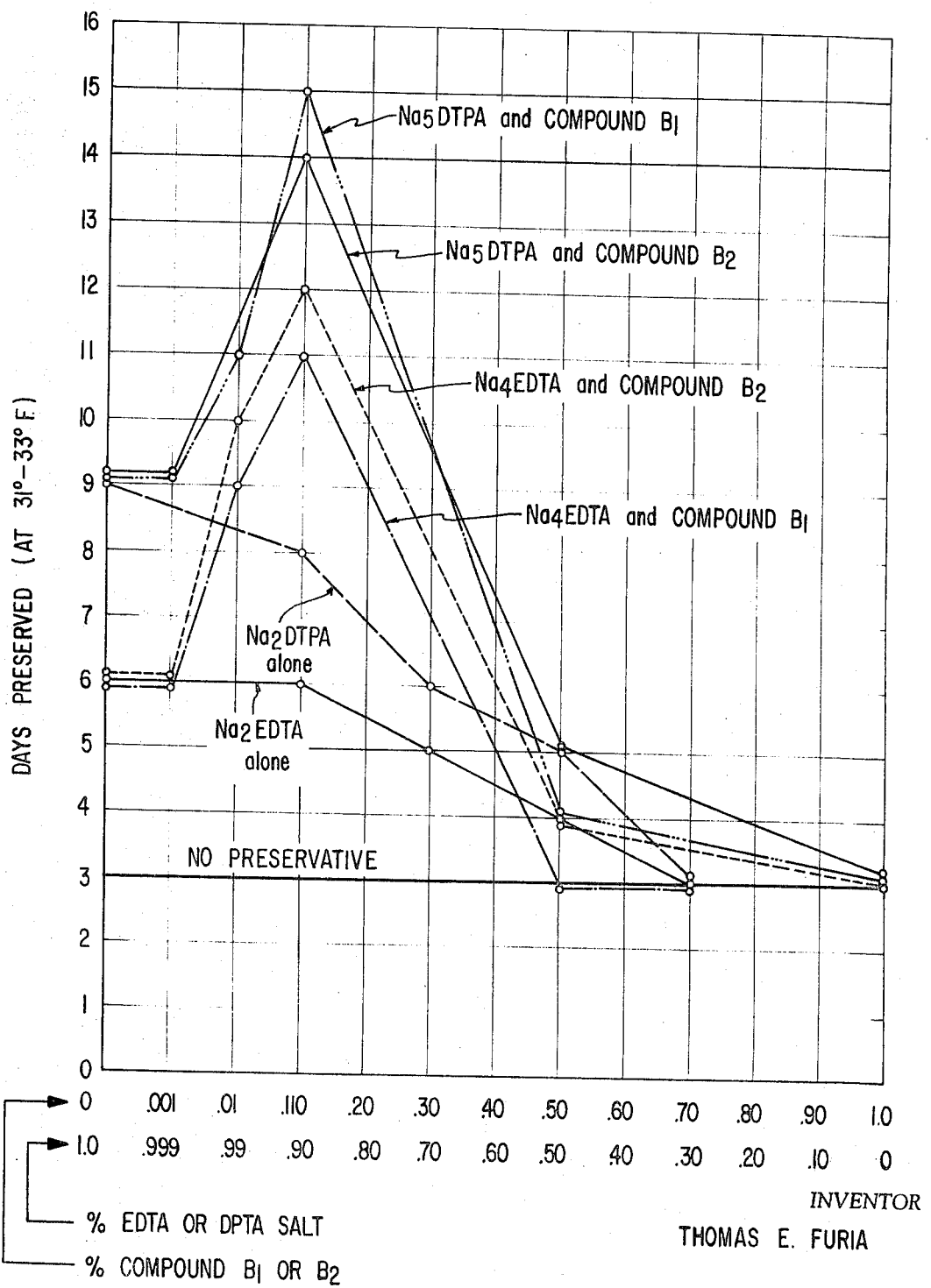

ABSTRACT OF THE DISCLOSURE

Freshly caught fish are preserved for increased periods of time by applying a composition comprising from about one part to about 500 parts of certain 2-hydroxy-polychlorodiphenyl ethers and from about 500 parts to about 999 parts of a polyalkylene-polyaminepolyacetic acid or salts thereof to the fish. A preferred embodiment comprises dipping the fish for 20 seconds in an aqueous solution of about 0.10 part 2-hydroxy-3',4,4'-trichlorodiphenyl ether and about 0.90 part sodium salt of ethylenediaminetetraacetic acid.

THE INVENTION

This invention relates to a new and improved process for the preservation of fresh fish and compositions therefor.

In the past, freshly caught fish have generally been preserved for the market by storage in ice at about 31–33° F. If no steps other than icing were taken, fish stored in this manner spoiled after three or four days storage. After this time, the fish developed an unacceptable odor and flavor, which rendered them unfit for human consumption.

Various steps have been taken in an attempt to increase the storage time of fresh fish packed in ice. The most widely employed method until recently consisted in dipping fresh fish for about 20 seconds in an aqueous bath containing approximately 10 parts per million of an antibiotic such as chloro- or oxy-tetracycline. This method usually resulted in increasing the storage life of the fish fillets to about 10–20 days when packed in ice.

Because of the potential undesirable consequences possible by the injestion of uncontrolled quantities of antibiotics by humans, the Food and Drug Administration has banned the application of such antibiotics to fish.

This has severely limited the available market area for freshly caught fish of many distant producers because of the greatly contracted permissible storage period and/or increased costs through the necessity of using more rapid transportation facilities.

Various attempts at finding other effective methods to increase the storage span for freshly caugh fish have been proposed and have met with varying degrees of success.

Castell and other members of the Canadian Fisheries Research Board have found that such chelating agents as ethylenediaminetetraacetic acid, its sodium salts, sodium citrate, and the like, increase the storage time of fish. For instance, about 250 parts per million of ethylenediaminetetraacetic acid, when deposited upon fish, have been found to increase the permissible storage time of the fish to approximately six days.

Another chelating agent, diethylenetriaminepentaacetic acid, when applied in similar amounts to fresh fish fillets, provides approximately eight to nine days protection.

Combinations of chelating agents and the above-mentioned antibiotics, have been used in the processing of fresh fish into various food products obtainable from the fish by a digestive process. Such a process is described in U.S. Pat. 3,249,442 Keyes. The preservative agent such as oxytetracycline or chlorotetracycline, is added to prevent bacteria growth, to control undesirable loss of nutritive value of the fish products made by breaking the fish down through an enzymatic digestive process. In this instance, the chelating agents are employed to maintain the preservative action of the known preservatives, oxytetracycline and chlorotetracycline.

It has now been found that the storage life of fresh fish can be increased substantially over the time of storage previously possible by use of chelating agents alone, and without antibiotics.

According to my invention, the storage time of iced fresh fish is greatly enhanced by applying to the fish a composition comprising from about 500 parts to about 999 parts of
(A) A compound of the formula:

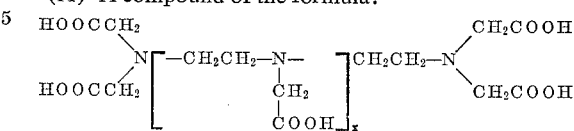

wherein $x$ is an integer of from 0 to 6, or a water soluble, alkali metal, or ammonium, or amine salt thereof; and from about one part to about 500 parts by weight of
(B) A compound of the formula:

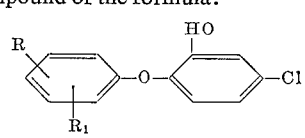

wherein R is a halogen atom, and $R_1$ is either chlorine or hydrogen.

Particularly useful compounds falling within the scope of (A) are ethylenediaminetetraacetic acid and ethylenetriaminepentaacetic acid, and the alkali metal, ammonium, and amine salts thereof.

In the compound of (B), R is preferably chlorine and $R_1$ is preferably chlorine.

Specifically preferred compounds within the scope of (B) are: 2-hydroxy - 3',4,4' - trichlorodiphenyl ether, and 2-hydroxy - 4,4' - dichlorodiphenyl ether, particularly the former.

One of the advantages in employing the compounds of (B) in this new composition is that they generally volatize at relatively low temperatures and thus under most cooking conditions will be removed from the fish.

In evaluating the comparative effectiveness of various compositions for the preservation of fresh fish in ice, the following procedures were followed.

Fresh fillets of haddock caught in Middle Atlantic waters were cut into circular plugs measuring three inches in diameter employing sterile techniques. The test plugs were then dipped for twenty seconds in the aqueous test solutions, drained for thirty seconds, and placed in sterile plastic petri dishes. The petri dishes were wrapped in polyvinylidene chloride film, packed in crushed ice, and placed in a refrigeration compartment where the temperature was maintained at between 31–33° F.

Double blind odor evaluation tests were run on each sample once daily by two judges. The odor of each sample was evaluated as acceptable or unacceptable.

The aqueous solution employed in all instances comprise 50% water and 50% food grade propylene glycol. The compounds of (A) are only slightly soluble in water and the use of propylene glycol or a similar agent permits utilization of the compounds in solution levels of over 1% concentration.

In Table I the effectiveness of two representative agents commonly employed by the prior art is indicated. $Na_2EDTA$ is a sodium salt of ethylenediaminetetraacetic acid and $Na_2DTPA$ is a sodium salt of diethylenetriaminepentaacetic acid.

TABLE I

| Percent $Na_2$ EDTA | Percent $Na_2$ DTPA | Control [1] | Days of protection at 31–33° F. |
|---|---|---|---|
| | | x | 3 |
| 0.1 | | | 3 |
| 0.3 | | | 3 |
| 0.5 | | | 4 |
| 0.7 | | | 5 |
| 0.9 | | | 6 |
| 1.0 | | | 7 |
| | 0.1 | | 3 |
| | 0.3 | | 3 |
| | 0.5 | | 5 |
| | 0.7 | | 6 |
| | 0.9 | | 8 |
| | 1.0 | | 9 |

[1] Water or 50:50 propylene glycol (F.G.)/water.

Table II illustrates the lack of protective value of representative compounds of Formula B in preserving freshly caught fish from deterioration. The Compound $B_1$ is 2-hydroxy-3',4,4'-trichlorodiphenyl ether and Compound $B_2$ is 2-hydroxy-4,4'-dichlorodiphenyl ether. Only at the relatively high concentration of 1.0% do the compounds of Formula B exhibit any, even minor degree, of preservative action. Such higher concentrations of Formula B compounds are generally not too practical because of higher costs and a tendency to impart a slight sweet taste.

TABLE II

| Percent compound $B_1$ | Percent Compound $B_2$ | Control [1] | Days of protection at 31–33° F. |
|---|---|---|---|
| | | x | 3 |
| 0.001 | | | 3 |
| 0.01 | | | 3 |
| 0.10 | | | 3 |
| 1.0 | | | 4 |
| | 0.001 | | 3 |
| | 0.01 | | 3 |
| | 0.10 | | 3 |
| | 1.0 | | 4 |

[1] Water or 50:50 propylene glycol (F.G.)/water.

The graph on the accompanying drawing dramatically demonstrates the greatly increased storage time imparted to fresh fish fillets treated according to the practice of this invention. The left hand side of the graph shows the number of days that fish fillets are preserved when stored in ice at 31–33° F.

At the bottom of the graph, the various percentages of four representative components of the compositions of this invention are indicated. In each instance, the total of solution components is 1.0%.

In this test, here the solution comprises 1.0% of either Compound $B_1$ or $B_2$, there was no increase in the days preserved over the time for untreated fish.

The sodium salt of EDTA when used alone at 1.0% concentration increases the preservation time to six days and the sodium salt of DPTA increases the preservation time to nine days. As illustrated, the addition of minor amounts of either Compound $B_1$ or $B_2$ increases the preservation time up to six additional days in many instances, which is very unexpected when it is realized that neither Compound $B_1$ or $B_2$ when present at a full 1% concentration increases the preservation time over that of the untreated fish.

Concentrations of solutions in the range of about 0.5 to about 5.0% by weight of solution are recommended, with about 0.5 to about 2.0% preferred. A concentration of about 1.0% seems to be the most desirable.

A dip time of about 20 seconds with a 1.0% concentration is very satisfactory, but the time suitably may range from about 10 seconds to one minute depending on the solution concentration and pick-up desired.

In general, very satisfactory results are obtained when from 50–500 parts per million of the composition of this invention are applied on the fish.

While in the above examples the preservative composition has been applied to the fish from dip solutions, the invention is not, of course, restricted to this means of application. The fish may be surface sprayed with the composition, or a powder form may be dusted on, or the composition may be included in the ice. Other alternatives include injection into the vascular system of the fish.

While the invention has been explained by detailed description of certain specific embodiments, it is understood that various modifications and substitutions can be made in any of them within the scope of the appended claims which are intended also to include equivalents of such embodiments.

What is claimed is:

1. A method of preventing the spoilage of fish comprising applying to said fish an effective amount of a composition comprising from about 500 parts to about 999 parts of (A) A compound of the formula:

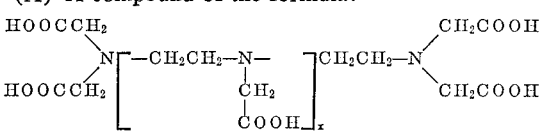

wherein $x$ is an integer of 0 to 6, or a water soluble, alkali metal, or ammonium, or amine salt thereof; and from about one part to about 500 parts by weight of (B) A compound of the formula:

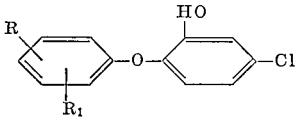

wherein R is a hologen atom, and $R_1$ is either chlorine or hydrogen.

2. A method of preventing the spoilage of fish comprising dipping said fish for about 20 seconds in a composition of matter comprising an aqueous solution of from 0.50 to 0.999 part per hundred parts by weight of said solution of (A) A compound of the formula:

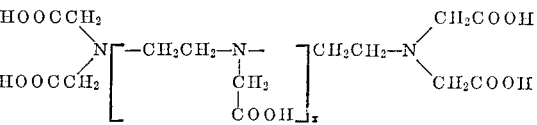

wherein $x$ is an integer of 0 to 6, or a water soluble, alkali metal, or ammonium, or amine salt thereof; and from about 0.001 part to 0.50 part per hundred parts by weight of said solution of (B) A compound of the formula:

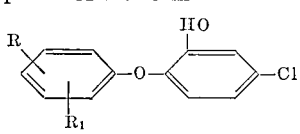

wherein R is a halogen atom, and $R_1$ is either chlorine or hydrogen.

3. A method is claimed in claim 2 wherein B is 2-hydroxy-3',4,4'-trichlorodiphenyl ether and A is a sodium salt of ethylenediaminetetraacetic acid.

References Cited

UNITED STATES PATENTS

| | | | |
|---|---|---|---|
| 3,025,168 | 3/1962 | Greenberg | 99—187 |
| 3,041,183 | 6/1962 | Ferrante et al. | 99—171 |
| 3,044,884 | 7/1962 | Rader et al. | 99—150 |
| 3,057,735 | 10/1962 | Ottke et al. | 99—158X |
| 3,116,969 | 1/1964 | Coleman, Jr. | 21—74 |
| 3,252,962 | 5/1966 | Whaley et al. | 260—112 |
| 3,255,021 | 6/1966 | Earle et al. | 99—195 |
| 3,459,561 | 8/1969 | Mook et al. | 99—157 |
| 2,868,655 | 1/1959 | Laudenburg | 99—158 |
| 2,933,399 | 4/1960 | Nickerson et al. | 99—222 |
| 3,150,160 | 9/1964 | Dexter | 99—159X |
| 3,497,535 | 2/1970 | Lennon | 260—398.5 |
| 3,506,720 | 4/1970 | Model et al. | 260—613 |

NORMAN YUDKOFF, Primary Examiner

F. E. DRUMMOND, Assistant Examiner

U.S. Cl. X.R.

99—160, 224